United States Patent [11] 3,607,977

[72] Inventors Glenn L. Taylor
 Palos Verdes;
 John W. Cotton, Mill Valley; De Loss E.
 Winkler, Orinda, all of Calif.
[21] Appl. No. 759,521
[22] Filed Sept. 12, 1968
[45] Patented Sept. 21, 1971
[73] Assignee Shell Oil Company
 New YOrk, N.Y.

[54] BLOCK COPOLYMER COMPOSITIONS
 EXHIBITING ALTERED SURFACE ACTIVITY
 3 Claims, No Drawings
[52] U.S. Cl....................................................... 260/876,
 3/1, 117/76, 117/161, 161/249, 210/321, 260/836,
 260/878, 260/880, 260/881, 260/885, 260/886
[51] Int. Cl....................................................... C08f 29/12
[50] Field of Search............................................ 260/876 B

[56] References Cited
UNITED STATES PATENTS
3,240,844 3/1966 Gruver ......................... 260/876
3,458,600 7/1969 Mann ........................... 260/876

Primary Examiner—Samuel H. Blech
Attorneys—William H. Myers and Joseph W. Brown

ABSTRACT: Block copolymer compositions are provided comprising a hydrocarbon block polymer containing at least three polymer blocks one or more being of a monovinyl arene and one or more being of a conjugated diene or hydrogenated derivative of said polymers, combined with certain derivatized block copolymers characterized by their content of blocks compatible with the monovinyl arene blocks of the first block polymer and by their content of a second type of polymer block which is incompatible with the first named polymer block but may or may not be compatible with the conjugated diene polymer blocks of the first block polymer. These compositions are especially useful for such purposes as adhesion to polar surfaces, reduction in flammability, improvement in weatherability and other properties.

BLOCK COPOLYMER COMPOSITIONS EXHIBITING ALTERED SURFACE ACTIVITY

BACKGROUND OF THE INVENTION

Block copolymers of monovinyl arenes such as styrene with conjugated dienes such as butadiene or isoprene have been studied in considerable detail during the past few years. Furthermore, hydrogenated derivatives of these have been prepared. A wide spectrum of these hydrocarbon polymers has been developed in which their physical properties are related to the molecular weights of the individual polymer blocks and further upon the ratio of the thermoplastic blocks, e.g., polystyrene, to elastomeric blocks, e.g., polybutadiene, as well as upon the number of blocks within any given polymer chain. Thus a range of products with properties varying from these of plastics to those of elastomers has been developed and particularly a relatively restricted class of so-called thermoplastic elastomers has been studied. The latter term is means to refer to block copolymers which exhibit the flow properties of thermoplastic materials above the softening points of both types of blocks but which at ambient temperatures exhibit the properties of high tensile strength rubber without having been subjected to vulcanization. These materials have been utilized in many commercial applications but due to their entirely hydrocarbon nature exhibit certain physical characteristics which it would be desirable to alter or enhance. Thus the adhesion of these hydrocarbon polymers to polar surfaces has been less than desireable. Furthermore, their flammability limits their field of application. Moreover, it has been noted that due to the residual unsaturation in the conjugated diene portion of the block polymer they are subject to oxidation and degradation in the absence of air or light.

OBJECT OF THE INVENTION

It is object of the present invention to provide improved block copolymer compositions having substantially increased polar character. It is a particular object of the invention to provide compositions containing both a hydrocarbon block copolymer and a block copolymer capable of imparting a certain degree of polarity to the composition It is a further object of the invention to increase the adhesion of block copolymer compositions to polar surfaces. Other objects include promoting wetability by aqueous systems, improving fire resistance and watering resistance. Other objects will become apparent during the following detailed description of the invention.

STATEMENT OF THE INVENTION

Now, in accordance with the present invention, novel block copolymer compositions are provided comprising 100 parts by weight of a block copolymer having the general configuration A-B—(B-A)$_{1-5}$
and hydrogenated derivatives of said polymers and 1—100 parts by weight of a second block copolymer having the general configuration A-C—(C-A)$_{0-5}$
and hydrogenated derivatives thereof wherein each A is a polymer block of a monovinyl arene, B is a polymer block of a conjugated diene and C is a polymer block different from polymer blocks A and B. More specifically, the second block copolymer may be derived by sequential or coupling operations, by grafting or by derivatization, the latter being the most preferred routes. It has been found as will be discussed more fully hereinafter that the diverse consequences of the generic scope of this invention results in a wide variety of improvements depending upon the nature of the block C and its relationship to the other groups. It is to be stressed, however, that the polar groups injected into the composition by means of the invention as described more fully hereinafter are more than would result from mere terminating radicals for the polymer chains. On the contrary, the polar groups must be present in an amount substantially greater than can be obtained by mere polar termination of the chains and normally will be present to an extent of saturating at least 10 percent of the double bonds which are present in the conjugated diene chain when the polymer block C is a polar derivative of a conjugated diene polymer (including copolymer) block.

Still more specifically, the polar groups especially contemplated include those block copolymers in which the polymer block C is a conjugated diene polymer block or its hydrogenated equivalent wherein at least 10 percent of the double bonds of block C are replaced by substituents containing functional groups of the group consisting of halogen, hydroxyl, carboxyl, carbonyl, phosphono, acid anhydride, amino, epoxy, mercapto, sulfate, sulfonate, amido, esters, and combinations thereof. This results in a novel type of composition having a curious combination of aspects. The supplementary block polymer, namely, the second block polymer which comprises a "phase anchor" in the form of polymer blocks A which are compatible with the blocks A of the first block polymer and usually are substantially identical therewith. On the other hand, the block C is such that it not only imparts a polarity for desired reasons to the composition but, if incompatible, tends to migrate to the surface of the composition. Thus it will be understood that these compositions may not be precisely uniform throughout and that the second block polymer may be found to concentrate eventually at or near the surface of the composition. In fact, it has been found that these compositions may be assembled by coating the first polymer with the polar polymer.

The first block copolymer which the compositions of the present invention are intended to modify is essentially a hydrocarbon block polymer which may be obtained by sequential block polymerization or by sequential polymerization incorporating a coupling feature. Thus the invention especially contemplates the use of block polymers having the general configuration A-B—(B-A)$_n$
wherein $n$ is an integer from 1 to 5. When $n$ is 1 then the two B blocks may be regarded as a single B block, since they are adjacent. The blocks A comprise nonelastomeric polymer blocks of either alpha olefins or of monovinyl arenes such as styrene or alpha-methyl styrene, while the amorphous B blocks comprise alpha-olefin copolymer or elastomeric conjugated diene polymer or copolymer blocks such as those derived from butadiene or isoprene. Hydrogenated polymers of the above types also are contemplated. The above general formula allows for linear polymers such as those having the configuration polystyrene-polybutadiene-polystyrene or branched or nonlinear or star-shaped counterparts thereof having more than three polymer blocks. Special coupling reactions may be utilized in the formation of the linear or nonlinear species of this group of block copolymers but such reaction do not constitute an essential part of the present invention. It will be understood that the invention contemplates not only compositions which capitalize upon the present possibility of thermoplastic elastomers but also upon the modification of such block copolymers having a sufficiently high monovinyl arene polymer block content to result in a block copolymer having the general properties of a high-impact polystyrene or the like. This will depend in large measure on the relative proportions of the monovinyl arene polymer blocks. Preferably the blocks A comprise between 25 and 55 percent by weight of the nonpolar block copolymer and such polymers will be found to have the general properties of a thermoplastic elastomer insofar as high-tensile strength, high elasticity, and other stress-strain properties are concerned. Moreover, it is preferred, although not essential, that these nonpolar block copolymers be confined to a preferred molecular weight range in each polymer block so as to promote processability of the compositions in which they are used. Thus the preferred block copolymers for this purpose have polystyrene blocks with an average molecular weight each of between 12,000 and 30,000 while the conjugated diene polymer blocks have average molecular weights in the order of 35,000–100,000.

The above type of block copolymer has the substantial and outstanding advantage of performing as a "thermoplastic elastomer." By this is meant a polymer which behaves like a normally vulcanized rubber at ambient temperatures but has the properties of a thermoplastic material above the softening points of both types of polymer blocks. Due to the hydrocarbon nature of this block types of polymer blocks. Due to the hydrocarbon nature of this block copolymer, it is somewhat deficient in a number of aspects such as its ability to adhere to polar surfaces such as cellulosic textiles and the like and also is deficient in other respects for specialized purposes which require flame proofness, good weatherability and other desirable physical properties. The present invention is designed to overcome these special aspects.

The polar second polymer to be incorporated in the compositions of this invention is preferably present in an amount between about 1 and 100 parts by weight per 100 parts by weight of the above-described type of block copolymer. This modifying polar-containing second block copolymer may be prepared by derivatizing the first type of block copolymer or may be prepared by block polymerization of certain monomers imparting a polar character to at least one of the polymer blocks or may alternatively be formed by graft polymerization. Preferably the modifying second block copolymer is prepared by derivatization processes performed on the first-named type of block copolymer.

The polar-containing modifying block copolymer may have the general configuration $A-C-(C-A)_{0-5}$ wherein polymer blocks C are converted into a polar block by derivatization with such polar groups as halogen, hydroxyl, carboxyl, carbonyl, acid anhydride, amino, epoxy, mercapto, sulfate, sulfonate, and esters. Epoxidation is a preferred process for converting a conjugated diene block to a polar-containing block. This may be effected by reaction with such agents as peracetic acid, hydrogen peroxide with acetic acid and sulfuric acid or with hydrogen peroxide and formic acid. When utilizing peracid as the conversion agent, inert hydrocarbon solvent may be employed such as benzene with epoxidation temperatures in the order of 25°–45° C. and times of reaction from 0.3 to 4.0 hours. When employing hydrogen peroxide and acetic acid together with a catalyst such as sulfuric acid the product is usually a mixture of epoxide and hydroxy acetoxy groups while employing peroxide together with formic acid the derivatized conjugated diene polymer block contains both epoxide and hydroxy formoxy groupings.

These epoxy derivatives of block polymers may be still further converted in a number of different directions such as by hydrogenation to reduce unsaturation and at the same time convert epoxides into alcohols for the purpose of increasing oil resistance, tensile strength or modulus. On the other hand, the epoxide rings may be hydrolyzed to form the corresponding glycol such as by use of a mineral acid in an aqueous medium employing preferably a mutual solvent such as isopropyl alcohol at temperatures of 25°–75° C. for 1–8 hours. The epoxides are also convenient for grafting action wherein a polystyryl lithium is added directly to epoxided conjugated diene polymer (including vinylarene-diene copolymer as well as homopolymer) block to form a number of internal polystyrene blocks as contrasted to the terminal polystyrene blocks described in the hydrocarbon block polymer being modified. In the case of grafting it would be desirable to epoxidize to a greater extent than desired for simply grafting so that both polystyrene grafted chains as well as epoxide rings will depend from the conjugated diene chain. Preferably the grafting is effected in a polar medium such as tetrahydrofuran or other alcohols or in an inert hydrocarbon medium.

Hydrohalogenation may be effected to convert the diene block of a styrene-isoprene block polymer for several different reasons. For example, when hydrobrominating by the addition of HBr across the butadiene unsaturated linkages, it has been found that the hydrobrominated polymer has a surprising improvement in fire retardancy when the bromine content is in the order of 20–40 percent by weight. On the other hand, a surprising improvement in weatherability is effected by hydrochlorinating a block copolymer even to the extent of no more than about 3–4 percent by weight of chlorine. Wetability is improved by epoxidation followed by hydrolysis to form the corresponding alcohol or glycol. These examples illustrated the potential of derivatizing block copolymers to form the polar derivatives desired for incorporation in the nonpolar hydrocarbon block copolymers described hereinbefore.

When utilized in conjunction with the hydrocarbon block copolymers, the derivatization is conducted to such an extent that the derivatized block copolymer contains one relatively unaffected block which is at least compatible if not identical with the polymer blocks A of the hydrocarbon block copolymer while the second block, normally a conjugated diene polymer block, is derivatized to an extent sufficient to provide the desired polar character and preferably but not necessarily to make it incompatible both with polymer block A and polymer block B of the hydrocarbon block copolymer. Normally this will require that at least about 10 percent and usually at least about 20 percent of any conjugated diene double bonds be eliminated by replacement with functional groups.

The most preferred class of block copolymer employed for derivatizing purposes has the general structure polystyrene-polyisoprene. However, another preferred starting block copolymer for derivatizing has the structure polystyrene-polybutadiene-polystyrene. Corresponding two- and three-block copolymers to be used for derivatizing also comprises those in which the polybutadiene block is replaced at least in part or entirely with a polyisoprene block. Preferably the polymers to be so derivatized have from two to three blocks per molecule one of them being a polyvinyl arene block and the second being a conjugated diene polymer block. The preferred molecular weight range of the polyvinyl arene block being between about 5,000 and about 50,000 while the conjugated diene block which is the one in which derivatization occurs would have an average molecular weight in the range between about 10,000 and about 100,000. Suitable species of polar block polymers are typified by the following:

polystyrene-(hydroxylated polybutadiene)
polystyrene-(hydrobrominated polyisoprene)
polystyrene-(hydrochlorinated polyisoprene)
polystyrene-(epoxidized polybutadiene)
polystyrene-(carboxylated polybutadiene)
polystyrene-polymethacrylonitrile
polystyrene-polymethylmethacrylate
polystyrene-polyvinylacetate
polystyrene-poly-(2-vinylpyridine)
polystyrene-poly(dimethylacrylamide)

It will be noted according to the above list that polar monomers may be varied so as to impart polarity to the block copolymer such as in the use of methacrylonitrile, alkyl methacrylate, vinylacetate, vinylpyridines or acrylamides as one of the several types of block polymers which may be block polymerized with a monovinyl arene polymer block.

The compositions of this invention may be prepared may be prepared by either blending or coating procedures. It has been found, in fact, quite effective to apply the polar-type of block copolymer by solution coating or painting procedures on the surface of the hydrocarbon nonpolar-type of block copolymer. However, it is also possible to incorporate the two-block polymers together by well-known blending procedures.

The uses of the compositions of this invention are extremely diverse. For example, those compositions containing increased polarity in the form of oxygen-containing polar groups are especially useful for improving the adhesion of hydrocarbon block copolymers to polar textiles and the like such as cellulosic textiles. On the other hand, compositions of the invention incorporating substantial proportions of hydrobrominated conjugated diene polymer blocks are especially useful for the formation of flexible flame-retardant coatings or impregnates. On the other hand, compositions comprising the hydrocarbon block copolymer together with a hydrochlorinated block copolymer are especially important where the composition is to be exposed to oxidation or weathering since hydrochlorination substantially improves weathering resistance. The following examples illustrated several aspects of the present invention.

Other uses of the compositions of this invention include the production of nontoxic compositions especially useful for medical purposes such as in body organ transplants and synthetic body parts. Other potential uses include the use of

EXAMPLE I

A block copolymer having the structure polystyrene-polybutadiene-polystyrene, molecular weights of which were 9,500–52,000c09,500 was modified by hydrobromination with HBr resulting in the addition of HBr across the butadiene unsaturation. Hydrobromination was carried out by dissolving the block copolymer (150 grams) in benzene (2500 grams); cooling to 10° C.; adding a cooled solution of HBr (425 grams) in tetrahydrofuran (200 cc.); warming to room temperature for 6 days; washing the solution with water; dilute caustic; and then water until neutral; coagulating the hydrobrominated polymer in hot water and drying. The polymer derivative contained 41.3 percent by weight of bromine, the theoretical for complete bromination of the butadiene block being 52.5 percent. Blends of this hydrobrominated derivative with its precursor yielded a series of materials containing 10, 20, 30, and 40 percent by weight of bromine. Slabs of these materials were examined for fire retardancy. It was found that a material containing 10 percent of bromine would burn freely. The blend containing 20 or 30 percent of bromine could be ignited but was self-extinguishing. Finally, the blend containing 40 percent of bromine could not be ignited. The blend retained soft rubbery resilience in spite of their high bromine content.

EXAMPLE II

A block copolymer having the structure polystyrene-polyisoprene in which the block molecular weights were each 20,000 was hydrochlorinated to the extend of 28.2 percent chlorine in the polyisoprene block. One part by weight of the chlorinated block copolymer was combined with a block copolymer having the structure polystyrene-polybutadiene-polystyrene in which the block molecular weights were 14,000–64,000–14,000. The 20 percent blends were compression molded and submitted for atmospheric weathering in a supported bent loop test. After a period of 5 days the test pieces were rated by reference to a series of photographs of standard samples using a scale in which a rating of 10 signifies no apparent deterioration. The unmodified three-block copolymer test piece qualified for a rating of 7. The blend modified with 20 percent of the hydrochlorinated two-block copolymer qualified for a rating of 9–10.

We claim as our invention:
1. A composition comprising:
   a. 100 parts by weight of a first block copolymer of the group consisting of polymers having the general configuration A-B—(B-A)$_{1-5}$
   and hydrogenated derivatives of said polymers; and
   b. 1–100 parts by weight of a second block copolymer of the group consisting of polymers having the general configuration A-C—(C-A)$_{0-5}$
   and hydrogenated derivatives thereof, in which A is a polymer block of a monovinyl arene, B is a polymer block of a conjugated diene and C is a polymer block of a conjugated diene, said block C having at least 10 percent of its double bonds replaced by halogen atoms, block C being incompatible with blocks A and B.

2. A composition according to claim 1 wherein the first block copolymer has the general configuration polystyrene-polybutadiene-(polybutadiene-polystyrene)$_{1-3}$ and the second block copolymer has the general configuration polystyrene-poly(hydrobrominated butadiene).

3. A composition according to claim 1 wherein the first block copolymer has the general configuration polystyrene-polybutadiene-(poly-butadiene-polystyrene)$_{1-3}$ and, the second block copolymer has the general configuration polystyrene-(hydrochlorinated polybutadiene).